United States Patent
Zait et al.

(10) Patent No.: US 12,147,440 B2
(45) Date of Patent: Nov. 19, 2024

(54) TECHNIQUES FOR MAINTAINING STATISTICS IN A DATABASE SYSTEM

(71) Applicant: Oracle International Corporation, Redwood Shores, CA (US)

(72) Inventors: Mohamed Zait, San Jose, CA (US); Yuying Zhang, Foster City, CA (US); Hong Su, San Carlos, CA (US); Jiakun Li, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/483,326

(22) Filed: Sep. 23, 2021

(65) Prior Publication Data

US 2022/0012240 A1 Jan. 13, 2022

Related U.S. Application Data (62) Division of application No. 16/533,614, filed on Aug. 6, 2019, now Pat. No. 11,468,073.

(51) Int. Cl.
*G06F 16/24* (2019.01)
*G06F 16/22* (2019.01)
(Continued)

(52) U.S. Cl.
CPC ........ *G06F 16/2462* (2019.01); *G06F 16/221* (2019.01); *G06N 7/01* (2023.01); *G06N 20/00* (2019.01)

(58) Field of Classification Search
CPC .................................................. G06F 16/2462
(Continued)

(56) References Cited

U.S. PATENT DOCUMENTS 7,213,012 B2    5/2007 Jakobsson
7,644,730 B2    1/2010 Reck
(Continued)

FOREIGN PATENT DOCUMENTS

WO    WO-2020198925 A1 * 10/2020 ....... G06F 16/24542

OTHER PUBLICATIONS

Oracle® Database, "Performance Tuning Guide",11g Release 1 (11.1), B28274-02 Chapter 15-18, dated Jul. 2008, 500 pages.
(Continued)

*Primary Examiner* — Syling Yen
(74) *Attorney, Agent, or Firm* — Hickman Becker Bingham Ledesma LLP (57) ABSTRACT

Techniques are provided for gathering statistics in a database system. The techniques involve gathering some statistics using an "on-the-fly" technique, some statistics through a "high-frequency" technique, and yet other statistics using a "prediction" technique. The technique used to gather each statistic is based, at least in part, on the overhead required to gather the statistic. For example, low-overhead statistics may be gathered "on-the-fly" using the same process that is performing the operation that affects the statistic, while statistics whose gathering incurs greater overhead may be gathered in the background, while the database is live, using the high-frequency technique. The prediction technique may be used for relatively-high overhead statistics that can be predicted based on historical data and the current value of predictor statistics.

20 Claims, 4 Drawing Sheets

(51) Int. Cl.
  *G06F 16/2458* (2019.01)
  *G06N 7/01* (2023.01)
  *G06N 20/00* (2019.01)

(58) Field of Classification Search
  USPC ........................................................ 707/713
  See application file for complete search history.

(56) References Cited

U.S. PATENT DOCUMENTS

| | | | |
|---|---|---|---|
| 2003/0093408 | A1 | 5/2003 | Brown et al. |
| 2003/0167255 | A1 | 9/2003 | GraBhoff et al. |
| 2006/0230035 | A1 | 10/2006 | Bailey et al. |
| 2006/0294058 | A1 | 12/2006 | Zabback et al. |
| 2008/0052266 | A1 | 2/2008 | Goldstein et al. |
| 2008/0195577 | A1 | 8/2008 | Fan et al. |
| 2011/0022581 | A1 | 1/2011 | Korlapati |
| 2011/0313999 | A1* | 12/2011 | Bruno ............... G06F 16/24542 707/718 |
| 2012/0221534 | A1 | 8/2012 | Gao et al. |
| 2014/0095475 | A1 | 4/2014 | Su et al. |
| 2014/0303933 | A1* | 10/2014 | Simitsis ............ G06Q 10/063 702/181 |
| 2016/0299949 | A1* | 10/2016 | Konik ............... G06F 16/24542 |
| 2017/0031987 | A1* | 2/2017 | Desai ................ G06F 16/24542 |
| 2018/0246934 | A1 | 8/2018 | Arye et al. |

OTHER PUBLICATIONS

Lance Ashdown et al., "Oracle? Database SQL Tuing Guide 12c Release 1 (12.1)", Data Engineering, dated 2009, IEEE, 566 pages.
Zait, U.S. Appl. No. 16/248,479, filed Jan. 15, 2019, Notice of Allowance and Fees Due, Jun. 23, 2021.
Zait, U.S. Appl. No. 16/533,614, filed Aug. 6, 2019, Non-Final Rejection, Oct. 12, 2021.
Zait, U.S. Appl. No. 16/533,614, filed Aug. 6, 2019, Final Rejection, Jan. 28, 2022.
Zait, U.S. Appl. No. 16/533,614, filed Aug. 6, 2019, Notice of Allowance and Fees Due, Jun. 9, 2022.
Zait, U.S. Appl. No. 16/533,614, filed Aug. 6, 2019, Advisory Action, May 5, 2022.
Zait, U.S. Appl. No. 16/533,614, filed Aug. 6, 2019, Advisory Action, Apr. 22, 2022.
Schnaitter et al, "On-Line Index Selection for Shifting Workloads", IEEE, Apr. 20, 2007, pp. 1-10.

\* cited by examiner

TECHNIQUES FOR MAINTAINING STATISTICS IN A DATABASE SYSTEM

CROSS-REFERENCE TO RELATED APPLICATIONS; BENEFIT CLAIM

This application claims the benefit as a Divisional of application Ser. No. 16/533,614, filed Aug. 6, 2019; which application claims the benefit of (a) Provisional Appln. 62/715,263, filed Aug. 6, 2018, and (b) Provisional Appln. 62/856,246, filed Jun. 3, 2019; the entire contents of which is hereby incorporated by reference as if fully set forth herein, under 35 U.S.C. § 120. The applicant hereby rescinds any disclaimer of claim scope in the parent applications or the prosecution history thereof and advise the USPTO that the claims in this application may be broader than any claim in the parent applications.

This application is also related to U.S. patent application Ser. No. 16/248,479, filed Jan. 15, 2019.

FIELD OF THE INVENTION

The invention is related to techniques for maintaining statistics within a database and, more specifically, to techniques for maintaining statistics in a manner that balances the need for fresh statistics with the need to minimize the effect of statistics maintenance on database performance.

BACKGROUND

Frequently, the same database command can be executed multiple ways, each of which produces the same correct results. Each of the various ways a database command may be executed has a corresponding "execution plan". The database component that selects which execution plan to execute for a given query is referred to as the "optimizer".

While all execution plans for a query should produce the same correct results, the time and resources required to execute the execution plans of the same query may vary significantly. Thus, selecting the best execution plan for a query can have a significant effect on the overall performance of a database system.

When selecting among execution plans for a query, the optimizer takes into account statistics that are maintained by the database server. Based on the statistics, the database server may, for example, determine whether using one join technique will be more efficient than another, and whether accessing information from a particular index would be more efficient than accessing the same information directly from the underlying tables. Because the execution plan decision is made based on the statistics, the more accurate the statistics, the greater the likelihood that the optimizer will select the best execution plan.

Statistics that accurately reflect the current state of the database are referred to as "real-time" statistics. Unfortunately, real-time statistics are not always available to the optimizer because maintaining real-time statistics can impose a significant overhead to database command processing. Users typically have the option of executing a statistics-gathering processes to "manually" gather the real-time statistics needed by the optimizer. However, the overhead incurred by such manual statistics gathering operations can degrade performance in a manner that outweighs the performance benefit of choosing an execution plan based on real-time statistics.

To avoid such overhead, optimizers often have to select query plans based on "stale" statistics that do not reflect the current state of the database. The more "stale" the statistics, the less accurate the statistics tend to be, and the less accurate the statistics, the more likely the optimizer will select a sub-optimal query plan. For example, statistics that reflect the state of a table ten minutes ago will tend to be more accurate (and result in better query plan selection) than statistics that reflect the state of the same table ten days ago.

Numerous approaches for efficiently gathering statistics within a database system have been developed. Some such approaches are described, for example, in U.S. Pat. Nos. 9,582,525, 9,798,772, 10,073,885, and U.S. patent application Ser. No. 16/147,511, the contents of each of which are incorporated herein by reference. One approach for gathering statistics involves waiting for a "quiet period" during which that database system is not executing Database Manipulation Language (DML) commands that change the contents of the database. During the quiet period, the database server can execute the statistics-gathering processes to refresh all of the statistics needed by the optimizer. Those statistics are then used by the optimizer until new statistics are gathered during the next quiet period.

Such "quiet periods" are also referred to as "maintenance windows", because the quiet periods are used to perform maintenance operations that would slow down user applications if not executed during the quiet period. Often, maintenance windows are strictly enforced, so that any maintenance operation (such as statistics gathering) that does not complete within one maintenance window is stalled until the next maintenance window.

When the "maintenance window" technique is used, the accuracy of the currently-available statistics hinges on how much time has elapsed since the most recent maintenance window. Typically, the "maintenance window" during which statistics are gathered is overnight. Consequently, in the early morning hours, the statistics used by the optimizer of a database system may be relatively accurate. On the other hand, in the evening hours, the statistics used by the optimizer may be relatively inaccurate, since the statistics do not account for changes made by the DML commands executed during that day. Statistics are even less accurate if the statistics-gathering process is unable to finish during a single maintenance window.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for gathering statistics in a database system. The techniques involve gathering some statistics using an "on-the-fly" technique, some statistics through a "high-frequency" technique, and yet other statistics using an "prediction" technique. The technique used to gather each type of statistic is based, at least in part, on the overhead required to gather the statistic. For example, low-overhead statistics may be gathered "on-the-fly", while statistics whose gathering incurs greater overhead may be gathered using the high-frequency technique. High-overhead statistics may be predicted based on other statistics that are gathered on-the-fly. Further, these techniques may be used in conjunction with other techniques, such as executing the statistics-gathering processes during maintenance windows.

The on-the-fly technique involves storing statistics information reflects changes made by DML operations at the time the DML changes are performed, and as part of the same process that performs the DML changes. According to one embodiment, rather than updating the on-disk copy of the statistics (which is typically found in a dictionary table of the database) to reflect the statistic changes caused by a DML operation, "delta statistics" are stored in an in-memory statistics repository.

In one embodiment, the in-memory delta statistics that are generated in this manner are periodically flushed to disk reserved for delta statistic . When the optimizer needs statistics to help select which competing query plan to execute for a given query, the optimizer may call an API that retrieves the needed delta statistics from the in-memory repository, the corresponding delta statistics from the dictionary table, the corresponding base statistics and merges them all to create "updated statistics" that are then used by the optimizer to decide among execution plans.

Maintaining on-the-fly statistics in this memory first provides "fresh" statistics without incurring the overhead that would be required for each DML operation to update the on-disk statistics in the dictionary table in real-time. Such overhead would be significant, since any number of concurrently executing DML operations would have to contend to obtain a write lock on the relevant statistics in the dictionary table. Because of the freshness of the updated statistics, the optimizer is able to more accurately select the most efficient query plans. The stats are flushed from the memory to the disk in a background job. Therefore the overhead is not visible to foreground applications.

In one embodiment, the delta statistics are also stored separately on disk from the base statistics. This provides an isolation between the two statistics so that we can easily turn on and turn off usage of delta statistics. This is not only beneficial for testing but also provides a control in the rare case where delta statistics are hurting query performance.

According to one embodiment, some statistics that are not maintained using the on-the-fly technique are gathered using a "high-frequency" gathering technique. According to the high-frequency gathering technique, the database system does not wait for a maintenance window to gather statistics. Instead, the database server periodically initiates a background statistics-gathering process. The background statistics-gathering process is able to gather and store statistics regardless of what other processes are executing in the foreground. In one embodiment, the statistics-gathering process is configured to begin processing only if no other instance of the statistics-gathering process is active. To reduce the negative effect the statistics-gathering process has on performance of concurrently executing foreground processes, the amount of CPU-cycles allocated to the statistics-gathering process is capped (e.g. at no more than 5% of available CPU-cycles).

Predicted statistics are statistics that are predicted from historical information. For example, the database server may store a history of timestamps, row counts, and number of distinct values (NDV) for a column. If the historical data indicates that the NDV of the column tends to increase by 50 for every 1000 rows added to the table, then the database server may predict, based on on-the-fly statistics that indicate that 1000 rows have been added to the table, that the NDV count for the column is 50 more than the NDV values stored at the latest-refresh-time.

The prediction models are built on the columns that have significant NDV change in the history, only for which there would be value in prediction because the column NDV is prone to change over time.

The prediction model is automatically maintained in the background, either in the maintenance windows or the high frequency statistics processes. New models are built and existing models are refreshed in the model gathering process. A model can be enabled or disabled depending on whether its quality satisfies our metric.

Before trying to refresh an existing model, a check is made to determine if there has been enough new statistics points gathered since last model creation time. For models that no longer satisfy the quality metric, their usage is disabled instead of dropping them. In this way, the system avoids repeatedly building the same model on the same history data of a column, which is a waste.

Once a model is built, the system periodically extrapolates the NDV with on-the-fly statistics and store the extrapolated result on disk. During query compilation time, the extrapolated NDV is used with other on-the-fly statistics. In other words, the extrapolation is done offline and does not incur overhead during query compilation time.

Database Statistics

A database system may maintain statistics at various levels. For example, a database system may maintain table-level statistics, column-level statistics, and index-level statistics. Table-level statistics include, for example, the number of rows in a table, and the number of blocks in a table.

Column-level statistics include, for example, the lowest value in a column (MIN), the highest value in the column (MAX), the average column width (in bytes), the cardinality of the column, and a histogram of values in the column.

Assuming that an index is implemented using a tree structure (e.g. a B–tree or B+tree, etc.), index-level statistics may include: number of leaf nodes in the index, the depth of the index tree, the total size of index, the number of distinct keys, a clustering factor, etc. Other types of statistics may be used for other types of indexes.

These are merely examples of the types of statistics with which the statistics-gathering techniques described herein may be employed. The techniques described herein are not limited to any particular statistic or set of statistics.

Gathering on-the-Fly Statistics

Figure 1:
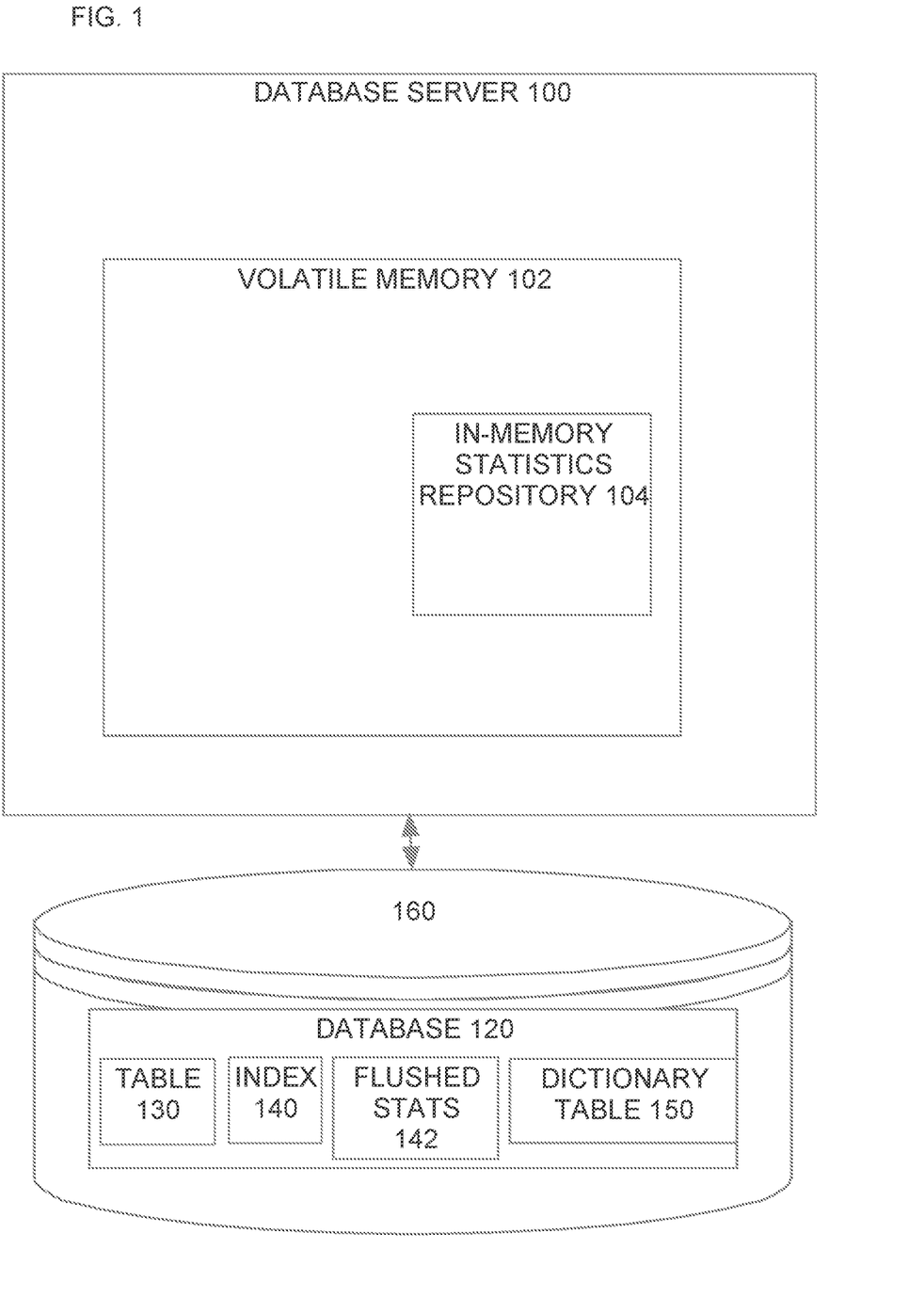
FIG. 1 is a block diagram of a database system configured to store delta statistics in volatile memory, according to an embodiment.

As mentioned above, gathering on-the-fly statistics involves storing, at the time the DML changes are performed, statistics information that reflects changes made by DML operations. In one embodiment, the statistics information is stored in an in-memory statistics repository by the processes that are performing the DML operations that affect the statistics. Referring to FIG. 1, it is a block diagram of a database system, according to an embodiment. The database system includes a database server 100 that has volatile memory 102. Within the volatile memory 102, the database server 100 maintains an in-memory statistics repository 104 for those statistics that are gathered on-the-fly.

The database server 100 is operatively coupled to one or more persistent storage devices, which are collectively represented by disk 160. The storage devices persistently store a database 120 that is managed by database server 100. Database 120 includes a table 130 that stores user data and a dictionary table 150 that persistently stores statistics associated with database 120, including table statistics, column statistics and index statistics. For example, dictionary table 150 may store table statistics for table 130, column statistics for each column in table 130, and index statistics for an index 140 that is built on one or more columns of table 130.

Because the on-the-fly statistics information is stored in response to the commit of the DML operations that affect the statistics, the statistics information in the in-memory statistics repository 104 is very fresh. Further, since the statistics information is stored in in-memory statistics repository 104 rather than committed to the dictionary table 150, the overhead associated with maintaining the statistics is significantly reduced. Further, unlike the statistics in dictionary table 150, which are typically maintained in a table-like structure, the statistics stored in in-memory statistics repository 104 may be stored in structures that optimize access efficiency, such as linked lists, hash tables, or a combination thereof.

According to one embodiment, on-the-fly statistics are maintained during data change operations, such as INSERT, DELETE, UPDATE and MERGE, regardless of whether the operations affect a single row or a large number of rows, and regardless of whether the operations use conventional or direct path insertion methods. (Direct path insertion techniques typically require a lock on the entire table into which rows are being inserted, and inserted rows are stored on newly allocated blocks, rather than writing to any already-allocated blocks of the table.) As mentioned above, the maintenance of on-the-fly statistics is performed by the process that is performing the data change operation that affects the statistics.

Currently on-the-fly statistics are maintained only for the cheapest statistics. According to one embodiment, the database server maintains on-the-fly statistics for at least: table row count, table block count, column minimum, and column maximum values, number of nulls, average column length of columns. This is only an example of the statistics for which a database server may maintain on-the-fly statistics, and the techniques described herein are not limited to any particular set of on-the-fly statistics. Nevertheless, the framework, i.e., the in-memory repository, the tables for delta statistics on tables, the flushing mechanism are all general for other types of statistics.

For the purpose of explanation, the maintenance of on-the-fly statistics shall be explained using an example in which a DML command inserts ten rows into a table 130 that has three columns c1, c2 and c3. Such an insert operation can affect statistics for the table 130, the columns, and any indexes (e.g. index 140) associated with table 130, as shall be explained hereafter. It shall be further assumed that dictionary table 150 contains statistics that are accurate as of a most recent execution of the corresponding statistic-gathering process. The commit time of the most recent execution of a statistics-gathering process shall be referred to herein as the "latest-refresh-time". Often, the latest-refresh-time will be during the most recent maintenance window.

On-the-Fly Table Statistics—Row Count

One table-level statistic affected by the insertion of ten rows into table 130 is the "row count" of table 130. According to one embodiment, the database server 100 performs on-the-fly tracking of the DML changes (inserts, deletes, updates) that happen on each table since the latest-refresh-time. For example, immediately after the latest-refresh-time, the dictionary table 150 may indicate that table 130 as 1000 rows, and in-memory statistics repository 104 may include a "delta" value of 0, indicating that no rows have been added or deleted to table 130 since the latest-refresh-time.

In response to the insertion of the ten rows into table 130, the database server 100 may update the in-memory statistics repository 104 by incrementing the delta row count value by 10 to indicate that ten rows have been added since the latest-refresh-time. In one embodiment, access to each statistic within the in-memory statistics repository 104 is governed by a latch. Thus, to update the in-memory statistics, the DML process would obtain a latch on the delta row count value for table 130 within in-memory statistics repository 104, increment the delta row count value by 10, and then release the latch on the delta row count value.

When a delta row count change is maintained within in-memory statistics repository 104 in this manner, the real-time row count can simply be computed by combining the DML changes (the delta row count from in-memory statistics repository 104) and the old row count stored in the dictionary table 150 ("tab$.row_count):

> real-time row count=tab$.row_count+delta-row-count
> (where delta-row-count is the number of inserts
> since the latest-refresh-time minus the number
> of deletes since the latest-refresh-time)

On-the-fly delta statistics are initially maintained in in-memory statistics repository 104. In one embodiment, the delta-statistics in the in-memory statistics repository 104 are periodically flushed to disk 160 via a background flush process (e.g. every 15 minutes). The flushed-to-disk statistics are illustrated in FIG. 1 as flushed-statistics 142. After the flush, the delta statistics in the delta row count in in-memory statistics repository 104 may be reset to zero. In such an embodiment, to get the up-to-date row count, the database server 100 combines the information from three sources:

> real-time row count=(delta row count in flushed statistics 142)+(row count in dictionary table 150)+(delta row count in in-memory statistics repository 104).

For example, assume that the row count stored in the dictionary table is 150. That is, as of the latest-refresh-time, table 130 had 150 rows. Assume that, after the latest-refresh-time, 100 rows were inserted and 50 rows were deleted. A record of the 100 insertions and 50 deletions (or a delta row count of 50) would be maintained in the in-memory statistics repository 104. At that point, the information from the in-memory statistics repository 104 may be written to disk 160 as flushed stats 142. In response to the in-memory statistics being flushed to disk, the delta row count statistics in the in-memory statistics repository 104 are reset. Then, additional DML operations may result in 50 more inserted rows, and 20 more row deletions (a new delta row count of 30). At that point in time:

Dictionary table 150 indicates table 130 has a row count of 150.

Flushed Statistics 142 indicate a delta row count of 50 (100 insertions and 50 deletions).

In-memory statistics repository 104 indicates a delta row count of 30 (50 insertions and 20 deletions).

By merging these statistics, the database server 100 may produce an on-the-fly row count of 150+(100−50)+(50−20)=230. The optimizer may then use the on-the-fly row count of 230 as a basis for selecting among execution plans for a query.

According to one embodiment, a copy of the flushed delta row count and a copy of the dictionary table 150 row count may be cached in volatile memory 102. In such an embodiment, the generation of the real-time row count is faster because all three of the components thereof are available from the volatile memory 102.

In yet another embodiment, the database server does not maintain a delta row count in volatile memory. Instead, the row count within the dictionary table 150 is updated every time a DML operation that affects the row count is committed. In such an embodiment, the dictionary table 150 will always reflect an updated row count. However, the DML operations will have to contend for write permission to update the row count within table 150.

In a clustered database system that includes multiple database servers, each database server may maintain its own delta row count in its volatile memory. In such clustered systems, the database servers may periodically merge and synchronize their in-memory delta row count values.

For the purpose of explanation, an embodiment has been described in which the delta statistics are "reset" in volatile memory after being flushed to disk. However, in an alternative embodiment, flushing the statistics of a table to disk allows the volatile memory to be reused for other statistics. Thus, after a flush to disk of the delta statistics of table 130, the in-memory statistics repository 104 may no longer have any delta statistics for table 130. New delta statistics for table 130 are then added to in-memory statistics repository 104 if/when another DML process performs an action that affects the statistics of table 130. Freeing up volatile memory after statistics are flushed is desirable because there may be long periods during which no DML affects a table, and it would be wasteful to continue to consume volatile memory for that table's statistics during those periods.

Merging Statistics

In the example given above, computing an on-the-fly version of the row count involved merging the delta row count from volatile memory 102, the delta row count flushed to disk (e.g. in flushed statistics 142), and the row count from the dictionary table 150. However, merging statistics also occurs to combine the statistics from different DML processes.

For example, within a single instance of a database server, multiple DML process may be executing concurrently, each of which is performing insertions that affect the row count of table 130, and the MIN/MAX values of the columns of table 130. In one embodiment, each concurrent DML process maintains its own delta statistics and, upon committing, causes those statistics to be merged into server-wide delta statistics maintained in-memory statistics repository 104. As mentioned above, access to the server-wide statistics maintained in the in-memory statistics repository 104 may be governed by latches.

Further, multiple database server instances may be executing DML operations that affect the same statistics. In one embodiment, each of those database server instances maintains its own server-wide statistics in its respective volatile memory, and periodically merges its server-wide statistics with the server-wide statistics of all other database server instances. The merger of the server-wide statistics may be performed, for example, by flushing each server's server-wide statistics to disk 160, and then merging the statistics into dictionary table 150. In one embodiment, a lock is used to serialize write access to each of the statistics maintained in dictionary table 150.

The way that statistic values are merged is based on the statistic in question. For example, merging the delta MIN values of a column (obtained from multiple DML processes in a server, or server-wide delta MIN values from multiple server instances) is performed by selecting the minimum of the delta MIN values. Similarly, merging the delta MAX values of a column is performed by selecting the maximum of the delta MAX values. On the other hand, merging the delta row count statistics of a table (obtained from multiple DML processes in a server, or server-wide delta row counts from multiple server instances) involves summing the delta row count statistics.

On-the-Fly Table Statistics—Block Count

Another table-level statistic for which database server 100 may perform on-the-fly tracking is the block count of table 130. On disk 160, the data for table 130 is stored in segments, and every segment has an associated extent map that records the total number of blocks consumed by the table. The extent map is changed as part of the DML process that performs the changes that cause new extents to be added to a table. Consequently, to obtain an on-the-fly block count of table 130, the database server 100 simply reads the block count from the extent map of table 130 before optimizer consumes this information.

On-the-Fly Column Statistics

Columns-level statistics include minimum value, maximum value, number of distinct values (NDV), number of nulls, average column length, and histogram. These are much harder to maintain on-the-fly, than a table's row count and block count. However, reducing the staleness of such statistics is important, because significant errors may occur if the optimizer uses stale column-level statistics from dictionary table 150.

For example, consider the scenario where the optimizer is determining an execution plan for the query "SELECT name FROM emp WHERE age >80". Assume that the actual MAX value in the age column of table emp is 85, but the stale MAX value recorded in dictionary table 150 is 75. This scenario may occur, for example, if a row with age=85 has been inserted since the latest-refresh-time. When the optimizer uses the stale MAX value of 75, the optimizer may conclude that no rows will satisfy the condition "age >80", and based on this erroneous conclusion, the performance of processing the query may suffer, due to use of inaccurate statistics.

On-the-Fly Column Statistics For Min/Max

To avoid errors caused by the optimizer's use of stale column-level statistics, on-the-fly column-level statistics are computed for the minimum and maximum value of columns, according to an embodiment. Therefore, for those tables whose statistics have not been recently refreshed, the optimizer has access to up-to-date minimum and maximum values of each column. Among other things, access to real-time minimum and maximum values of each column helps the optimizer accurately identify and handle out-of-range queries.

Similar to on-the-fly table statistics tracking, on-the-fly MIN/MAX tracking involves performing extra work whenever a DML operation happens. In one embodiment, the work performed depends on whether the DML operation is performing inserts, deletes, or both (where updates are treated as deletes followed by inserts).

For on-the-fly MIN/MAX tracking for insert operations, a "delta" minimum value, and a "delta" maximum value for each column are maintained within in-memory statistics repository 104. After performing a statistics-gathering operation (e.g. during a maintenance window) for the MIN/MAX values of columns, the dictionary table 150 is updated with the MIN/MAX for each column, and delta MIN/MAX values in in-memory statistics repository 104 are initialized. According to one embodiment, the delta MIN/MAX are initialized to ZERO, not the MIN/MAX values stored in the dictionary table, and the in-memory repository only tracks the MIN/MAX of the delta data change performed since the latest-refresh-time.

In an alternative embodiment, the delta MIN/MAX are initialized to the MIN/MAX values stored in the dictionary table. For example, assume that table 130 has the columns "age" and "salary". Assume further that dictionary table 150 indicates the MIN/MAX values for "age" are 15/80, and the MIN/MAX values for "salary" are 20,000/1,000,000. Under these circumstances, the delta MIN/MAX values stored in in-memory statistics repository 104 are initialized to 15/80 for the age column, and 20,000/1,000,000 for the salary column.

Assume that immediately after the latest-refresh-time at which those statistics were stored in dictionary table 150, a DML operation is executed in which ten rows are inserted into table 130. The process that performs the DML also performs statistics maintenance by:

setting the delta age-minimum in in-memory statistics repository 104 to the lesser of (a) the current delta age-minimum, and (b) the lowest age value from the ten newly-inserted rows setting the delta age-maximum in in-memory statistics repository 104 to the greater of (a) the current delta age-maximum, and (b) the highest age value from the ten newly-inserted rows.

setting the delta salary-minimum in in-memory statistics repository 104 to the lesser of (a) the current delta salary-minimum, and (b) the lowest salary value from the ten newly-inserted rows setting the delta salary-maximum in in-memory statistics repository 104 to the greater of (a) the current delta salary-maximum, and (b) the highest salary value from the ten newly-inserted rows.

Thus, assuming that the highest age inserted in the 10 inserted rows is 85, the DML performing the insert operations would update the delta age-maximum value stored in in-memory statistics repository 104 to 85 because 85 is greater than the current delta age-maximum value of 80.

Similarly, if the lowest age inserted in the 10 inserted rows is 13, then the DML operation performing the inserts would update the delta age-minimum value stored in in-memory statistics repository 104 to 13 because it is less than the current delta age-maximum value of 15. The DML operation that performs the inserts would also update the delta salary MIN/MAX values in a similar fashion.

Since in-memory statistics repository only has the delta MIN/MAX, the optimizer will compute the freshest statistics on-the-fly by merging in-memory MIN/MAX and the dictionary table and use these statistics to process query.

Using Sampling to Reduce the Overhead of Maintaining On-the-Fly Statistics

Of course, on-the-fly maintenance of column-level statistics, such as MIN and MAX of each column, takes time and memory/disk space. Further, because the statistics-gathering overhead is performed by the foreground DML process that affects the statistics, the statistics-gathering overhead will affect the performance of the user application and might degrade the user experience. According to one embodiment, to minimize the work done in the foreground, techniques are provided that implement a sample-based live MIN/MAX, instead of an exact MIN/MAX. That is, to reduce the overhead required to maintain on-the-fly MIN/MAX column statistics, only a subset of the inserted rows are considered when determining the MIN/MAX values inserted during a DML operation.

For example, assume that a DML operation inserts 1000 rows. Without sampling, the values inserted in each column by each of the 1000 rows would need to be analyzed to determine the MIN/MAX values that are inserted by the DML operation into each of the columns. According to one embodiment, rather than analyze the values inserted in each of the 1000 rows, the database server 100 takes a random sampling of the 1000 rows. The random sampling may, for example, select only 100 of the 1000, rows. Determining the MIN/MAX values for each column of the 100 rows that belong to the sampling will incur significantly less overhead than would be required to determine the MIN/MAX values for all 1000 inserted rows.

Figure 2:
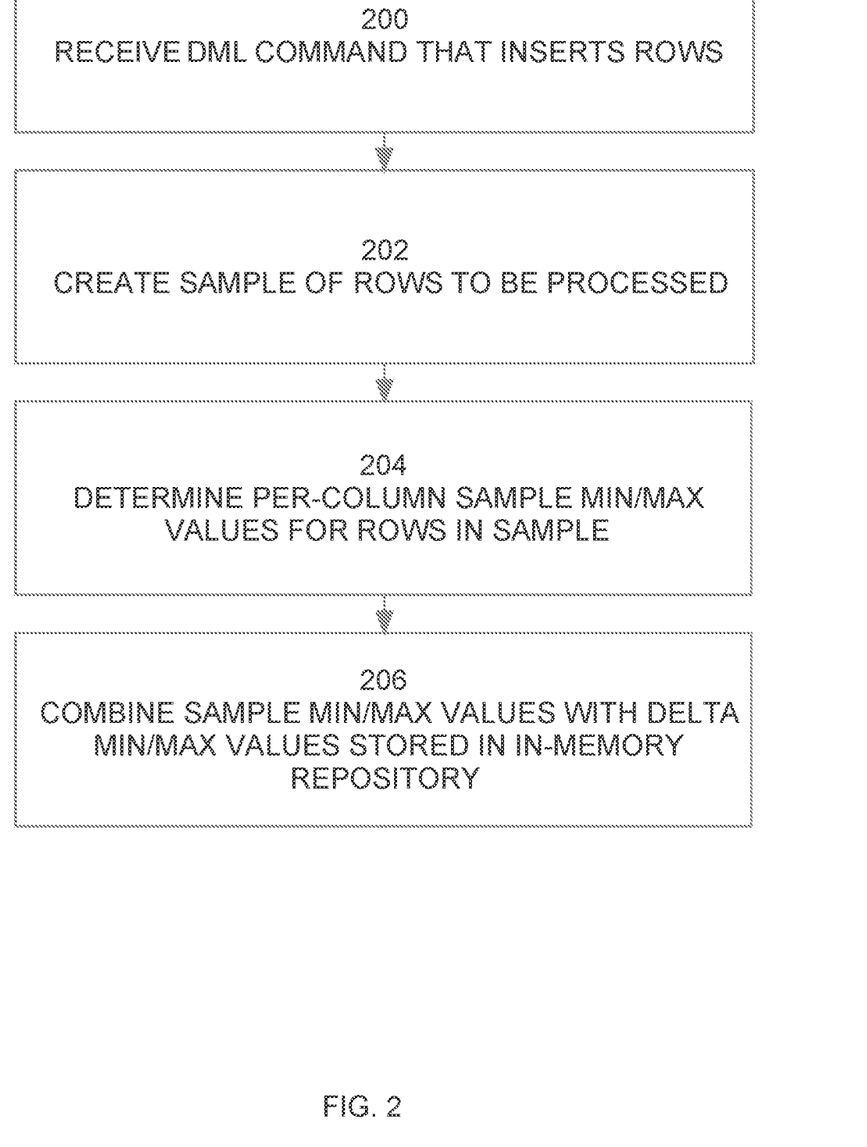
FIG. 2 is a flowchart illustrating steps of generating delta statistics for MIN/MAX statistics, according to an embodiment.

Referring to FIG. 2, it is a flowchart that illustrate steps performed by database server 100 to maintain on-the-fly per-column MIN/MAX statistics, according to an embodiment. At step 200, the database server receives a DML command that inserts rows (either through INSERT operations, or as part of UPDATE operations). At step 202, a sample is created from the rows to be inserted during the DML command. For example, the sample may be created by randomly selection one of every 100 rows to be inserted by the DML command. The actual sampling technique may vary, and the statistics maintenance techniques describe herein are not limited to any particular sampling technique.

At step 204, the database server 100 determines per-column sample MIN/MAX values for the rows in the sample. Finally, at step 206, the sample MIN/MAX values derived in this manner are combined with the delta MIN/MAX values stored in in-memory statistics repository 104. In one embodiment, the steps illustrated in FIG. 2 are performed by the same process that is performing the DML operation that inserts values. However, because MIN/MAX values are only determined for the sample, the overhead that the process incurs to perform statistics maintenance is significantly less that if all inserted rows were processed.

Permissible Inaccuracy

When on-the-fly delta statistics are generated based on a sampling, rather than all inserted values, the resulting statistics may be inaccurate. For example, assume that the current delta MAX age is 80, the MAX age in the sample is 85, and the MAX age in all inserted rows is 90. Under these circumstances, the delta MAX age would be updated to 85, even though a row where age=90 was inserted in to the age column.

Another circumstance that may lead to inexact statistics is the use of insert-only delta statistics. Insert-only delta statistics are delta statistics that only take into account the effect that insertions have on statistics, even though the DML operations may involve more than just insertions.

In one embodiment, rather than incur the extra overhead to ensure that the delta MIN/MAX statistics are accurate after updates and/or deletes, the delta statistics for MIN/MAX are allowed to become inaccurate. That is, the delta MIN/MAX statistics are only updated to account only for the inserts made by DML operations. Even though the insert-only delta MIN/MAX statistics may be inaccurate, the insert-only delta MIN/MAX statistics will tend to be more accurate than the statistics stored in dictionary table 150, which do not take into account any changes since the latest-refresh-time. Further, for columns in which values are necessarily increasing, such as date columns for a sales table, only taking into account the inserted values may still lead to an accurate MAX statistic.

High-Frequency Statistics Gathering

Unlike on-the-fly statistics gathering, high-frequency statistics gathering does not cause the same processes that are performing the DML operations that affect statistics to perform any additional work to maintain or update the statistics. Instead, high-frequency statistics gathering involves executing a statistics-gathering process in the background while allowing DML operations to continue to execute in foreground processes.

Because the statistics-gathering process is executing in the background, the CPU resources that are made available to the statistics-gathering process may be limited. For example, in one embodiment, the statistics-gathering process is allowed to consume no more than 5% of the CPU clock cycles available to database server 100.

The statistics-gathering process is considered "high-frequency" because the statistics-gathering process is initiated much more frequently than the occurrence of "maintenance windows". For example, in some systems, a maintenance window may occur only once every 24 hours. In contrast, a high-frequency statistics-gathering process may be started every 15 minutes.

The operations performed by statistics-gathering processes may take longer to execute than the interval that triggers the execution of the statistics-gathering processes. For example, a high-frequency statistics-gathering process may take 20 minutes to complete, even though the interval for executing the process if 15 minutes. Therefore, according to one embodiment, the database server 100 is designed to only start a new statistics-gathering process for a particular statistic or set of statistics if no other instance of the statistics-gathering process is active for that same statistic or set of statistics.

For example, if a MIN/MAX statistics-gathering process is initiated for a particular table at 1:00 pm, but has not finished by 1:15, no new MIN/MAX statistics-gathering process for that particular table is initiated 1:15. Instead, the currently-active MIN/MAX statistics-gathering process is allowed to continue without having to compete for resources with other statistics-gathering processes associated with the same column MIN/MAX statistics.

Adaptive-Frequency Statistics Gathering

In the example given above, high-frequency statistics are gathered at fixed time intervals. However, gathering statistics at fixed time intervals may be too frequent in some cases, and not frequent enough in other cases. If gathered too frequently, then the overhead of statistics gathering affects the performance of the system. If not gathered frequently enough, then the optimizer does not have fresh statistics to make the optimal execution plan selections.

It is expected that the number of DMLs that a table will experience is drastically increased during the ramp-up stage (when a table is initially populated, as during an initial migration of a table) and gradually becomes less and less active. When it is in ramp-up stage, statistics should be gathered very often to keep up with the data change. The same frequency will not be applicable when the size of the table reaches a certain order of magnitude.

Therefore, according to one embodiment, for high-frequency background statistics collection, instead of gathering statistics at a fixed frequency, an adaptive frequency is used which depends on the real workload. Only if the stale statistics of the table become critical is it highly possible that the optimizer will be misled by the statistics. Consequently, in one embodiment, background statistics collection is invoked only under those circumstances. Thus, in one embodiment, statistics maintenance is a demand-driven operation that needs to take action in both foreground and background, as shall be described in detail hereafter.

Queue for Statistics-Gathering

According to one embodiment, the database server 100 maintains a queue for statistics-gathering. Each entry in the statistics-gathering queue identifies a database structure, such as a table, partition, or index, for which it is time to gather statistics. The condition that triggers the insertion of an entry in the queue for statistics gathering is that the staleness of a database object exceeds a staleness threshold (e.g. 10%).

In one embodiment, as a foreground action, the database server 100 detects that a table exceeds the percentage staleness threshold and puts an entry for the target table into the queue waiting for background statistics collection. In a clustered database environment, the DML monitoring information in the volatile memory of each server node may not be sufficient to determine the staleness. Consequently, in such an embodiment, the statistics information in volatile memory of each server node is flushed to disk to make the staleness determination.

According to one embodiment, the database server creates a job that periodically wakes up to flush the DML monitoring info to disk, for example, every 1 minute. While flushing to disk the statistics of a particular table, the stale percentage of the particular table is computed. If the threshold is exceeded, the database server puts an entry for the particular table, an entry for the table is placed into a waiting queue.

In an alternative embodiment, a mechanism continuously checks whether the target queue is empty or not. If the queue is empty, the DML monitoring info for the various database objects that have experienced DML is flushed to disk. While flushing to disk the statistics of a particular table, the stale percentage of the particular table is computed. If the threshold is exceeded, the database server 100 puts an entry for the particular table into a queue for statistics-gathering.

In yet another embodiment, during the commit of a DML operation, the database server 100 computes the staleness on the fly to add objects involved in the current transaction to the queue for statistics gathering if the staleness of those objects exceeds the 10% threshold. The benefit of the DML-based staleness determination is that it is fully drift-driven, not time-driven. However, since the DML is executed in the foreground, the staleness determination is also executed in the foreground. As an action taken in the foreground, its overhead should be thoroughly minimized to reduce the effect on user applications.

Maintenance of the Queue for Statistics-Gathering

The queue for statistics-gathering may be shared by multiple distinct database server instances. According to one embodiment, every database server instance may add entries to the queue, and every database server instance may process entries that are at the head of the queue.

To process an entry that is at the head of the queue, a database server instance reads the database object identified in the entry, marks the entry as "in progress", and initiates the appropriate statistics-gathering operations to gather statistics for that database object. Upon completion of the statistics-gathering operations, the database server instance removes the entry from the queue (or marks the entry as "done") and updates the statistics for the database object in the dictionary table 150.

Predicted Statistics Generation

As stated earlier, it may be too expensive to maintain some statistics in real time. According to one embodiment, a predictive approach is used to predict approximate real-time values of those statistics.

For example, in one embodiment, the number of distinct values (NDV) of columns is not maintained in real time because to find out whether the value of a column in the row being inserted is new (the NDV should be incremented by 1) or old (the NDV remain the same) the value would have to be compared to the values of the column in the rows already present in the table. However, in many cases, the number of distinct values correlates with other types of statistics, e.g. count of rows, timestamps. If the correlated statistics are maintained in real-time, they can be used to derive the current NDV.

According to one embodiment, the database server generates on-the-fly predictions of certain statistics as follows:

The predictor statistics are maintained in real time (e.g. timestamp, count of rows)

The statistics gathering jobs gather and store the historical values of the target statistic and predictor statistics. The jobs also build prediction models on those columns that exhibit a strong correlation between predictor statistics and target statistics and refresh the model if the correlation pattern changes. The statistics gathering job can happen during a maintenance window or as part of high-frequency statistics gathering. Given predictor statistics which are maintained in real time, the system predicts the current target statistics using the prediction model created for this column, if such a model exists.

For example, assume that timestamps and row counts and NDVs for a table have been recorded for N points in the past (e.g. each of the last 100 days). This historic information can be used to create a prediction model that takes on-the-fly gathered statistics (e.g. timestamps, row counts) as inputs and outputs predicted NDV values. The prediction mechanism may be, for example, a machine learning engine. In a machine learning engine embodiment, the machine learning engine may be trained by feeding the machine learning engine the N records of (timestamp, row count), along with the corresponding previously-recorded NDV values.

Once the machine learning engine is trained in this manner, the database server 100 may cause the machine learning engine to generate an on-the-fly prediction of the NDV for the column by (a) gathering on-the-fly values for timestamp and table row count using the techniques described above, and (b) feeding those values to the trained machine learning system. While not guaranteed to be exact, the NDV value generated in this manner may be significantly more accurate than the stale NDV stored in the dictionary table 150, particularly if many DMLs have operated on the column since the latest-refresh-time of the NDV statistic for that column.

Multi-Tiered Statistics Gathering Approach

As explained above, different statistics present different statistics-gathering challenges. Some statistics, for example, can be maintained with significantly less overhead than other statistics. Further, some statistics may be more accurately predicted than other statistics. Therefore, according to one embodiment, a database system is provided with different statistics-gathering approaches for different statistics.

Figure 3:
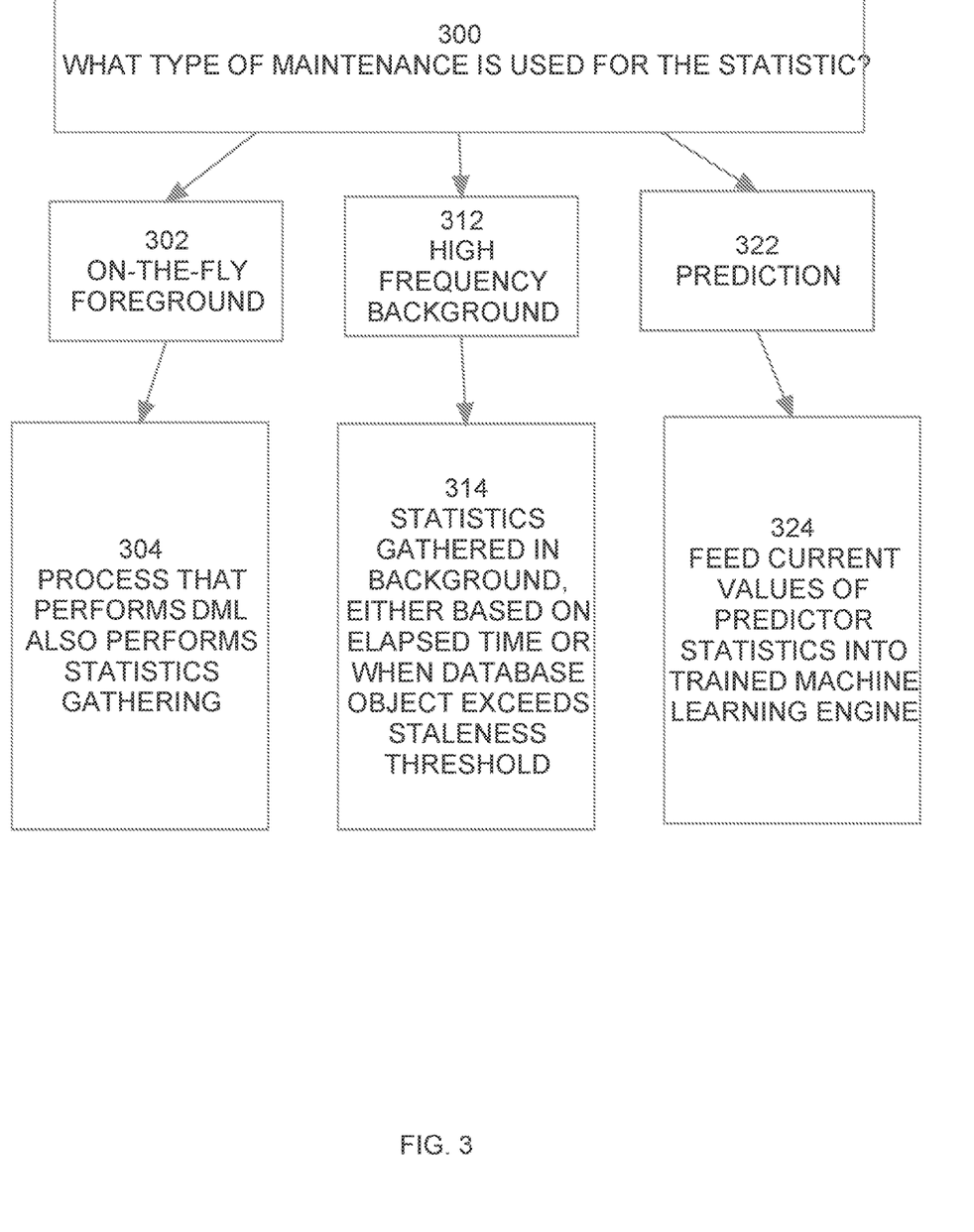
FIG. 3 is a diagram illustrating three types of statistics maintenance that may be used concurrently in a database system, according to an embodiment.

Referring to FIG. 3, it is a flowchart that illustrates how statistics are maintained by a database that implements a multi-tiered statistics gathering approach, according to an embodiment. Step 300 indicates that the way in which a statistic is gather is based on the type of statistic. For statistics, such as table row count, whose gathering incurs relatively small overhead, on-the-fly statistics gathering is performed, as illustrated at step 302. As explained at step 304, during on-the-fly statistics gathering, the process that performs the DML that affects the statistics also performs the operations for statistics gathering. For table row count, for example, the operation may involve updating an in-memory delta row count based on how many rows were inserted by the DML in question.

For statistics that require more overhead, high-frequency background statistics-gathering operations may be performed (step 312). As indicated in step 314, the background processes that perform the high-frequency statistics gathering may be initiated periodically, or based on the staleness of the corresponding database objects. In the latter case, adaptive-frequency may involve determining a degree of statistics staleness for each database object. For those that exceed a specified degree of staleness, an entry is added to a queue for statistics gathering. Background processes may read the record at the head of the queue, and gather the statistics for the database object associated with the entry.

Finally, for statistics that require significant overhead to gather on-the-fly, but that may be predicted with reasonable accuracy based on other statistics, statistics prediction may be used (step 322). As indicated in step 324, generating an on-the-fly prediction of a statistic may involve feeding on-the-fly values of predictor statistics to a trained machine learning engine. Based on the on-the-fly values of the predictor statistics, the machine learning engine outputs a predicted value for the predicted statistic. For example, a trained machine learning engine may output an NDV value for a column based on the current row count and MIN/MAX values for the column.

The complementary relationship of those three statistics maintenance techniques is as follows:

The most light-weighted statistics such as table row count, block count and column MIN/MAX/number of nulls, average column length are maintained by sample-based on-the-fly statistics gathering;

NDV, which cannot be maintain on-the-fly, will be taken care of by statistics prediction.

Since both on-the-fly statistics-gathering and statistics prediction are not 100% accurate, the background high-frequency statistics gathering will rectify the statistics when necessary. Note that statistics collected via high-frequency statistics gathering are accurate.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Statistics Retrieval

When the database server requires statistics (for example, to choose among competing execution plans of a query), the database server may retrieve the statistics in a variety of ways. For example, on-the-fly delta statistics may be periodically merged into the dictionary table, and the database server may be designed to always obtain statistics from the dictionary table. On the other hand, the database server may be designed to check in-memory statistics repository 104 for more recently generated on-the-fly statistics, and revert to dictionary table 150 only when such statistics are not in the in-memory statistics repository 104. In yet another embodiment, the database server may retrieve older statistics from dictionary table 150, delta statistics from in-memory statistics repository 104, and merge the two to provide on-the-fly statistics.

In yet another embodiment, the database server is insulated from the manner in which on-the-fly statistics are generated by providing an API through which the database server may request statistics. In response to calls made to the API, a statistics-generating process may generate the on-the-fly statistics in any one of a variety of ways. For example, depending on the actual statistics requested, the statistics-generating process may:

obtain statistics from dictionary table 150
obtain delta statistics from the in-memory statistics repository 104
combine delta statistics from the in-memory statistics repository 104 with statistics from the dictionary table 150
obtain predicted statistics from a prediction mechanism The statistics-generating techniques described herein are not limited to any particular mechanism for providing desired statistics to a database server.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
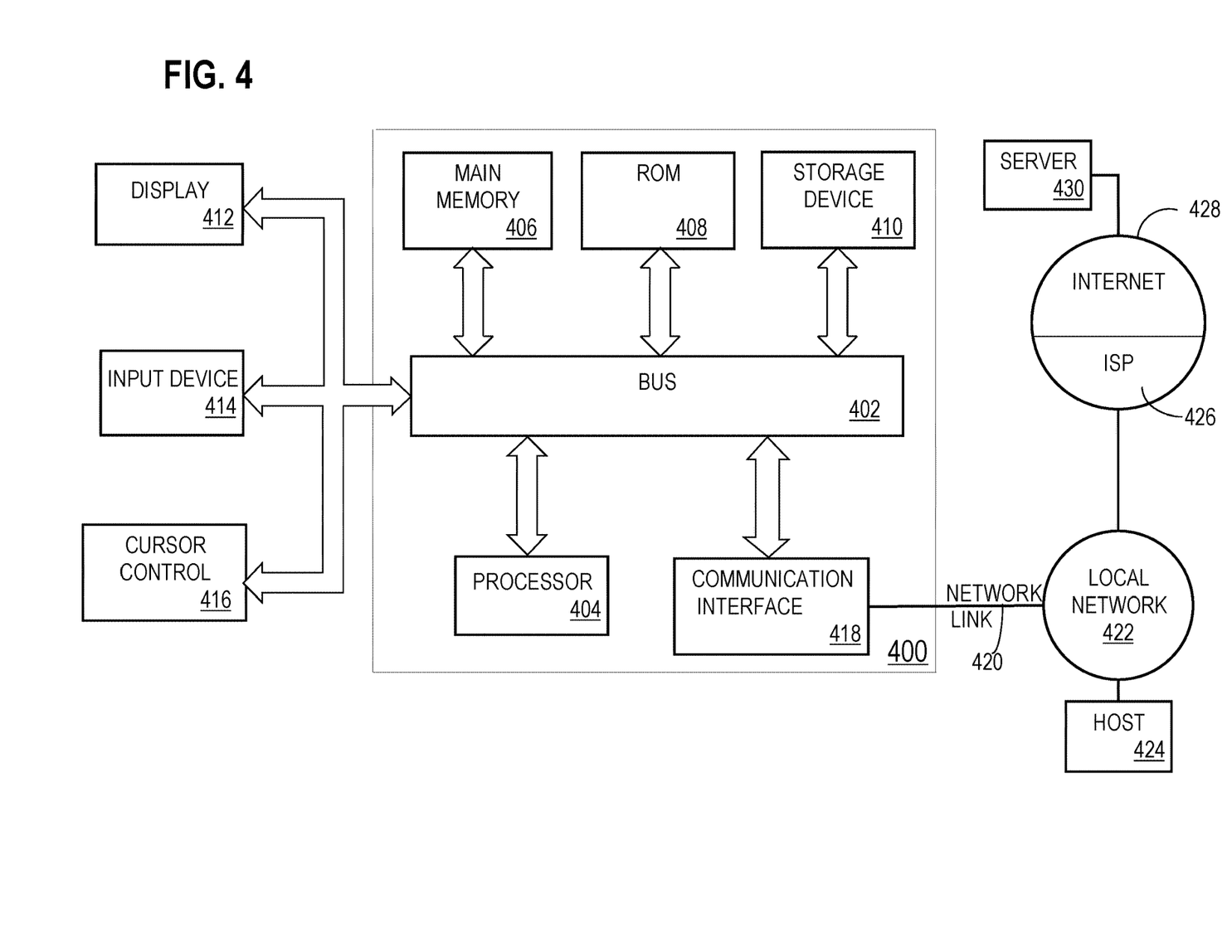
FIG. 4 is a block diagram of a computer system upon which embodiments of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
 obtaining current values for one or more predictor statistics for a particular statistic, wherein:
  the particular statistic is a column-level statistic that relates to values currently in a particular column of a particular database table, and
  each predictor statistic of the one or more predictor statistics is one of:
   a table-level statistic that relates to the particular database table,
   a column-level statistic, different from the particular statistic, that relates to values currently in a given column of a given database table, or
   an index-level statistic that relates to an index associated with the particular database table;
 generating, by a database server, a predicted value for the particular statistic, using a prediction mechanism, based on:
  the current values obtained for the one or more predictor statistics,
  historical values of the one or more predictor statistics, and
  historical values of the particular statistic;
 receiving, over a network from a requestor, a query that references the particular column of the particular database table;
 selecting, by the database server in response to the query, a particular query plan for the query, from among a plurality of candidate query plans, based at least in part on the predicted value for the particular statistic;

executing, by the database server, the query according to the particular query plan to generate a set of query results; and providing the set of query results to the requester over the network, wherein the method is performed by one or more computing devices.

2. The method of claim 1 wherein obtaining current values for the one or more predictor statistics includes generating one or more on-the-fly statistics for the one or more predictor statistics.

3. The method of claim 1 wherein the prediction mechanism is a trained machine learning engine.

4. The method of claim 1 wherein the particular statistic is number of distinct values of the particular column of the particular database table.

5. The method of claim 4 further comprising:
selecting the particular column as a column for which the number of distinct values is to be predicted;
wherein selecting the particular column is based, at least in part, on a degree to which the number of distinct values for the particular column is prone to change over time, as indicated by historical data associated with the particular column.

6. The method of claim 1 wherein:
the prediction mechanism uses a prediction model; and
the method further comprises maintaining the prediction model using background processes either during maintenance windows or using high frequency statistics processes.

7. The method of claim 1 wherein:
the prediction mechanism uses a prediction model; and
the method further comprises, once the prediction model is created, refreshing the prediction model only if enough new statistics points have been gathered since a last model creation time associated with the prediction model.

8. The method of claim 1 wherein:
the method further comprises:
storing the predicted value for the particular statistic; and
after receiving the query, using the stored predicted value for the particular statistic to process the query.

9. The method of claim 1 further comprising:
refreshing a stored value for the particular statistic by causing the database server to invoke a background-executing statistics-gathering operation,
wherein the background-executing statistics-gathering operation is invoked by the database server based on the particular statistic exceeding a staleness threshold relative to a particular database object in a database.

10. The method of claim 9 further comprising:
determining, by a foreground process, that the particular statistic of the particular database object exceeds the staleness threshold;
in response to determining that the particular statistic of the particular database object exceeds the staleness threshold, adding an entry for the particular database object to a queue for statistics gathering; and
invoking a background process that, based on the entry in the queue, executes a statistics-gathering operation to gather a current value of the particular statistic for the particular database object.

11. The method of claim 1 further comprising causing to be displayed on a display of a computer system content that is based on the set of query results.

12. One or more non-transitory computer-readable media storing instructions which, when executed by one or more processors, cause:
obtaining current values for one or more predictor statistics for a particular statistic, wherein:
the particular statistic is a column-level statistic that relates to values currently in a particular column of a particular database table, and
each predictor statistic of the one or more predictor statistics is one of:
a table-level statistic that relates to the particular database table,
a column-level statistic, different from the particular statistic, that relates to values currently in a given column of a given database table, or
an index-level statistic that relates to an index associated with the particular database table;
generating, by a database server, a predicted value for the particular statistic, using a prediction mechanism, based on:
the current values obtained for the one or more predictor statistics, historical values of the one or more predictor statistics, and historical values of the particular statistic;
receiving, over a network from a requestor, a query that references the particular column of the particular database table;
selecting, by the database server in response to the query, a particular query plan for the query, from among a plurality of candidate query plans, based at least in part on the predicted value for the particular statistic;
executing, by the database server, the query according to the particular query plan to generate a set of query results; and
providing the set of query results to the requester over the network.

13. The one or more non-transitory computer-readable media of claim 12 wherein obtaining current values for the one or more predictor statistics includes generating one or more on-the-fly statistics for the one or more predictor statistics.

14. The one or more non-transitory computer-readable media of claim 12 wherein the prediction mechanism is a trained machine learning engine.

15. The one or more non-transitory computer-readable media of claim 12 wherein the particular statistic is number of distinct values of the particular column of the particular database table.

16. The one or more non-transitory computer-readable media of claim 15 further comprising instructions for:
selecting the particular column as a column for which the number of distinct values is to be predicted;
wherein selecting the particular column is based, at least in part, on a degree to which the number of distinct values for the particular column is prone to change over time, as indicated by historical data associated with the particular column.

17. The one or more non-transitory computer-readable media of claim 12 wherein:
the prediction mechanism uses a prediction model; and
the one or more non-transitory computer-readable media further comprises instructions for maintaining the prediction model using background processes either during maintenance windows or using high frequency statistics processes.

18. The one or more non-transitory computer-readable media of claim 12 wherein:
  the prediction mechanism uses a prediction model; and
  the one or more non-transitory computer-readable media further comprises instructions for, once the prediction model is created, refreshing the prediction model only if enough new statistics points have been gathered since a last model creation time associated with the prediction model.

19. The one or more non-transitory computer-readable media of claim 14 wherein:
  the one or more non-transitory computer-readable media further comprises instructions for:
    storing the predicted value for the particular statistic; and
    after receiving the query, using the stored predicted value for the particular statistic to process the query.

20. The one or more non-transitory computer-readable media of claim 12 further comprising instructions for:
  refreshing a stored value for the particular statistic by causing the database server to invoke a background-executing statistics-gathering operation,
  wherein the background-executing statistics-gathering operation is invoked by the database server based on the particular statistic exceeding a staleness threshold relative to a particular database object in a database.

* * * * *

UNITED STATES PATENT AND TRADEMARK OFFICE
CERTIFICATE OF CORRECTION

PATENT NO. : 12,147,440 B2
APPLICATION NO. : 17/483326
DATED : November 19, 2024
INVENTOR(S) : Zait et al.

It is certified that error appears in the above-identified patent and that said Letters Patent is hereby corrected as shown below:

On the Title Page

Item [60], Line 2, below "6, 2019, now Pat. No. 11,468,073." insert -- (60) Provisional application No. 62/856,246, filed on Jun. 03, 2019, Provisional application No. 62/715,263, filed on Aug. 06, 2018. --, therefor.

On page 2, Column 2, item [56], Line 1, delete "Tuing" and insert -- Tuning --, therefor.

In the Specification

In Column 3, Line 34, delete "statistic ." and insert -- statistic. --, therefor.

In Column 6, Line 38, delete "latest-refresh-time)" and insert -- latest-refresh-time). --, therefor.

In Column 9, Line 42, delete "rows." and insert -- rows --, therefor.

In Column 16, Line 4, delete "mechanism" and insert -- mechanism. --, therefor.

Signed and Sealed this
Fourth Day of February, 2025

Coke Morgan Stewart
*Acting Director of the United States Patent and Trademark Office*